Patented Aug. 2, 1938

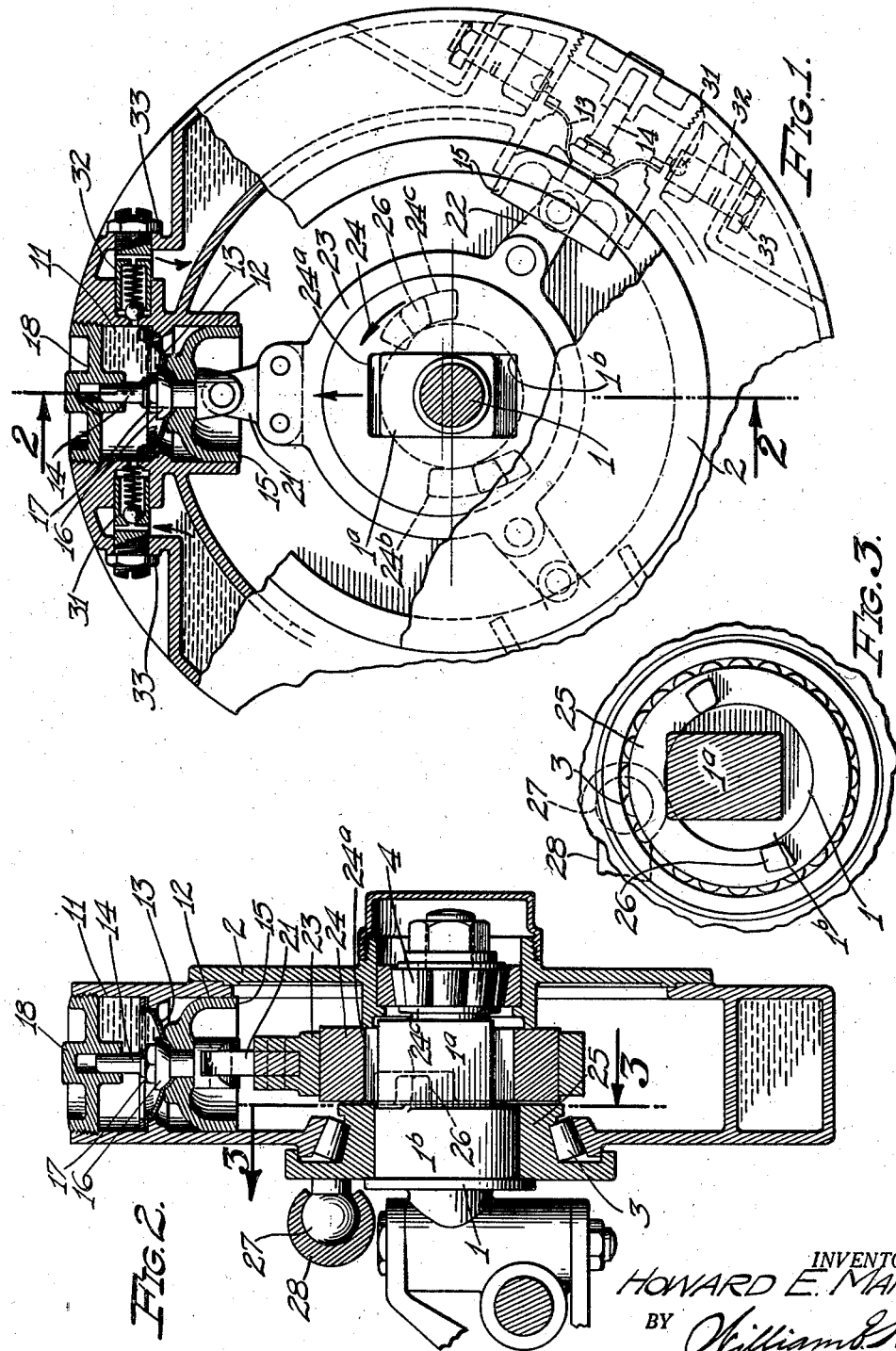

2,125,640

UNITED STATES PATENT OFFICE 2,125,640

HYDRAULIC BRAKE

Howard E. Marsh, Ventura, Calif.

Application January 27, 1936, Serial No. 61,004

3 Claims. (Cl. 188—91)

My invention relates to hydraulic brakes and particularly to improvements over Letters Patent No. 2,030,308, issued to me Feb. 11, 1936, for "Hydraulic brakes".

One of the principal objects of this invention is to provide a hydraulic brake of the class mentioned from which the compressed fluid will not leak, thus holding the brake fixed as set and serving immovably to lock the mechanism to which the brake is connected.

Another important object of this invention is to provide such a brake having relatively few moving parts.

A further object of this invention is to provide such a brake, for vehicles or for other purposes, which is very simple and economical of construction and operation.

With these and other objects in view as will appear hereinafter, I have devised a hydraulic brake having certain novel features of construction, combination and arrangement of parts and portions as will be hereinafter described in detail and particularly set forth in the appended claims, reference being had to the accompanying drawing and to the characters of reference thereon which form a part of this application, in which:

Fig. 1 is a fragmentary, outer side, elevational view of a wheel embodying my hydraulic brake, and showing parts thereof broken away and in section to facilitate the illustration;

Fig. 2 is a fragmentary, axial sectional elevation showing the embodiment in a vehicle wheel, the section of the principal mechanism being taken substantially through 2—2 of Fig. 1; and, Fig. 3 is a fragmentary section thereof taken through 3—3 of Fig. 2.

The specific embodiment of this invention, as shown in Fig. 2 of the drawing, is in the front wheel of a vehicle in which the wheel is adapted to be steered with respect to the frame of the vehicle. The spindle, designated 1, is here non-rotatable, but is shiftable laterally about a king pin. The wheel 2, which will be hereafter referred to as revoluble member, is rotatably mounted by means of roller bearings 3 and 4 on the spindle.

The radially outer portion of the wheel or revoluble member is preferably in the form of an annular reservoir intercepted by angularly spaced apart, radially arranged, cylindrical recesses. The outer ends of these cylindrical recesses form fluid compression chambers 11, while the radially inner end provide cylindrical guides 12. The chamber and guide of each such recess is separated by a yieldable diaphragm 13 which may be made of a flexible metal or leather, or the like. Through the axial portion of the diaphragm extends a stem 14 having at the radially inner end a piston-like slide 15 fitting and reciprocally mounted longitudinally in the guide 12. Radially outwardly from the slide is provided a suitable washer 16 and nut 17 for clamping the axial portion of the diaphragm against the slide 15. The radially outer end of the stem 14 is reciprocally mounted in a cap 18 which closes the outer end of the cylindrical recess. Thus both the inner and outer ends of the stem 14 are guided in its reciprocal movement.

The inner ends of the stems are pivotally connected, one by a main connecting rod 21 and the others by connecting rods 22, to an eccentric band 23. The main connecting rod 21 is rigidly secured to the eccentric band, and is adapted to oscillate the latter with the reciprocation of the connecting rod 21, while the connecting rods 22 are pivotally connected to the band. This band is rotatably mounted on an eccentric 24, which is mounted on the spindle 1, but shiftable transversely with respect thereto, so that the axis of the eccentric and of the spindle may be shifted coincident with each other when not desiring to reciprocate the stems 14 or move the diaphragm; or the eccentric may be shifted various distances with respect to the axis of the spindle for varying the stroke of the stems and the diaphragms.

The eccentric 24, which is also hereinafter referred to as a bearing, is provided with a transverse slot 24ª, through which extends a rectangular portion 1ª of the spindle for non-rotatably mounting the eccentric on the spindle, but the slot 24ª is of sufficient length to permit transverse shifting or adjustment of the eccentric for adjusting the axis of the eccentric coincident with the axis of the spindle or eccentric with respect thereto. The lateral or transverse shifting of the eccentric is effected by a collar 25 which is rotatably mounted on a cylindrical portion 1ᵇ of the spindle and provided at its outer side with a pair of diametrically opposed lugs 26 which extend into cam shaped slots 24ᵇ and 24ᶜ at the inner side of the eccentric. These slots 24ᵇ and 24ᶜ are so shaped that, when the collar 25 is rotated in the direction of the arcuate arrow in Fig. 1, the eccentric is raised, as also indicated by the upwardly pointing arrow, thereby shifting the eccentric 24 to an off-center position and permitting reciprocation of the stems and movement of the diaphragms. The collar 25 has a laterally extended arm 27, which is connected at its end to a suitable shifting arm 28. On the collar 25 is preferably mounted the roller bearing 3, upon which the inner side of the vehicle wheel is mounted.

In the diametrically opposite walls of the chambers 11 are provided check valves 31 and 32, the former allowing a fluid from the reservoir to enter the compression chamber 11 but preventing exit of the same, while the valve 32 allows the fluid from the compression chamber to be discharged into the reservoir when the pressure in the former becomes excessive. These valves are preferably so arranged that they may be adjusted from the outside of the revoluble member for adjusting the tension of the valve seating springs from the outside of the wheel or revoluble member. This is accomplished by passing the valves through the outer wall of the reservoir, the valves also extending through the walls separating the reservoir from the chamber, but adapted to connect only the latter two compartments. The screws in which the valves are mounted may be locked by lock-nuts 33, as shown.

The operation of my hydraulic brake is briefly as follows:

When the shifting arm 28 is in its receded position with the eccentric 24 in its lower position, as shown by dotted lines in the drawing the eccentric band 23 is concentric with the spindle and the revoluble member, permitting the latter to rotate freely on the spindle without reciprocation of the stems 14 and movement of the diaphragms. When the arm 28 is shifted towards the front of the vehicle, the lugs 36 will be revolved in the direction of the arcuate arrow, shown in Fig. 1, causing the eccentric to be raised eccentric to the axis of the spindle, and causing the stems 14 to be reciprocated and the diaphragms to be forced into the compression chambers as the revoluble member is rotated. As the arm 28 is shifted forwardly the resistance to the rotation of the revoluble member is thus increased until reciprocation of the stems and movement of the diaphragms, and therefore rotation of revoluble member, is prevented and the braking effort fully applied. The utilization of the diaphragms in the manner shown prevents any leakage past the moving members. Thus a substantially locking effect will be provided by means of the brakes.

Though I have shown and described a particular construction, combination and arrangement of parts and portions of my new hydraulic brake, I do not wish to be limited to the same, but desire to include in the scope of my invention the construction, combination and arrangement substantially as set forth in the appended claims.

I claim:

1. In a fluid brake, a revoluble member, a support therefor, one of the former having a compression chamber, a guide in alignment with the chamber, a yieldable diaphragm between the chamber and the guide forming the end wall of the chamber adjacent the other of the former members, and secured at its peripheral portion to the side wall of the chamber, a bearing mounted on said other of the former members at the central portion of the revoluble member, means mounted on the bearing and operatively connected to the yieldable portion of the diaphragm, the latter means having a flange reciprocally mounted in the guide and engaging the side of the diaphragm opposite the chamber, said flange covering the greater portion of the diaphragm inwardly from its secured peripheral portion, a removable cap for the end of the compression chamber opposite the diaphragm and provided at its axial portion with a longitudinal guiding recess, and a guide extending from the flange through the diaphragm and reciprocally mounted in the guiding recess.

2. In a fluid brake, a revoluble member, a support therefor, one of the former having a radial cylinder, a diaphragm secured at its peripheral portion to the walls of the cylinder intermediate the ends thereof, the end of the cylinder opposite the other of the former members forming a compression chamber and the other end forming a piston guide, a bearing mounted on said other of the former members at the central portion of the revoluble member, a piston member reciprocally mounted in said piston guide and having means engaging the side of the diaphragm opposite the chamber, said means covering the greater portion of the diaphragm inwardly from its secured peripheral portion and connecting means mounted on the bearing and operatively connected to the piston member, a removable cap for the end of the compression chamber opposite the diaphragm and having at the axial portion a longitudinal guiding recess, and a guide extending from the piston through the diaphragm and reciprocally mounted in the guiding recess.

3. In a fluid compressing means, a cylinder, a diaphragm secured at its peripheral portion to the walls of the cylinder intermediate the ends thereof, one end of cylinder serving as a compression chamber and the other end forming a piston guide, a piston reciprocally mounted in the guide and secured to the central portion of the diaphragm, a head for the end of the compression chamber and provided with a central guiding recess, and a guiding projection extending from the piston through the diaphragm and reciprocally mounted in the guiding recess.

HOWARD E. MARSH.